Dec. 31, 1946.  F. STADELMAN  2,413,339
CONVEYER
Filed May 6, 1944  5 Sheets-Sheet 1
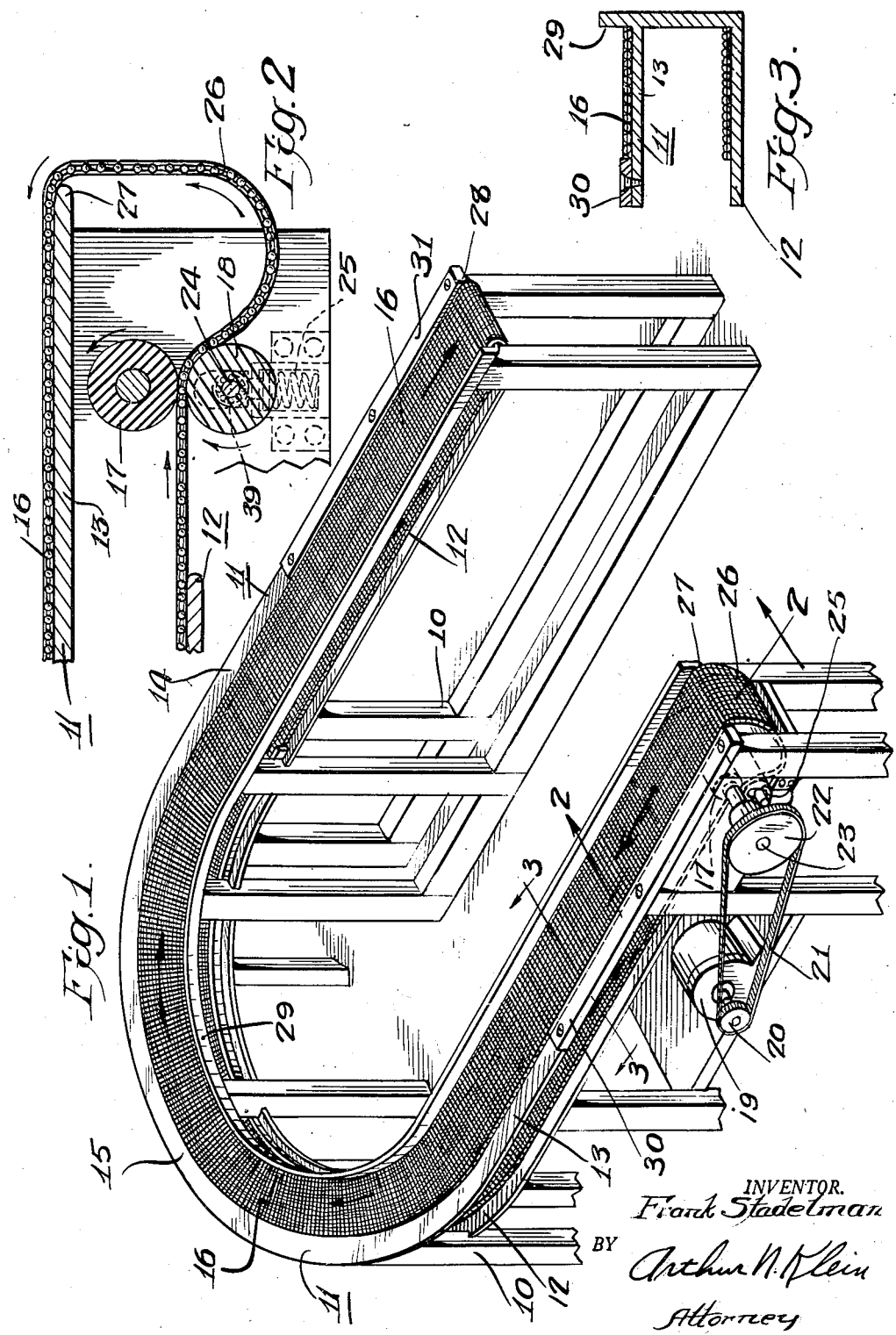
INVENTOR.
Frank Stadelman
BY Arthur N. Klein
Attorney Dec. 31, 1946.   F. STADELMAN   2,413,339
CONVEYER
Filed May 6, 1944   5 Sheets-Sheet 2

INVENTOR.
Frank Stadelman
BY Arthur N. Klein
Attorney

Dec. 31, 1946.   F. STADELMAN   2,413,339
CONVEYER
Filed May 6, 1944   5 Sheets-Sheet 3

INVENTOR.
Frank Stadelman
BY
Arthur N. Klein
Attorney

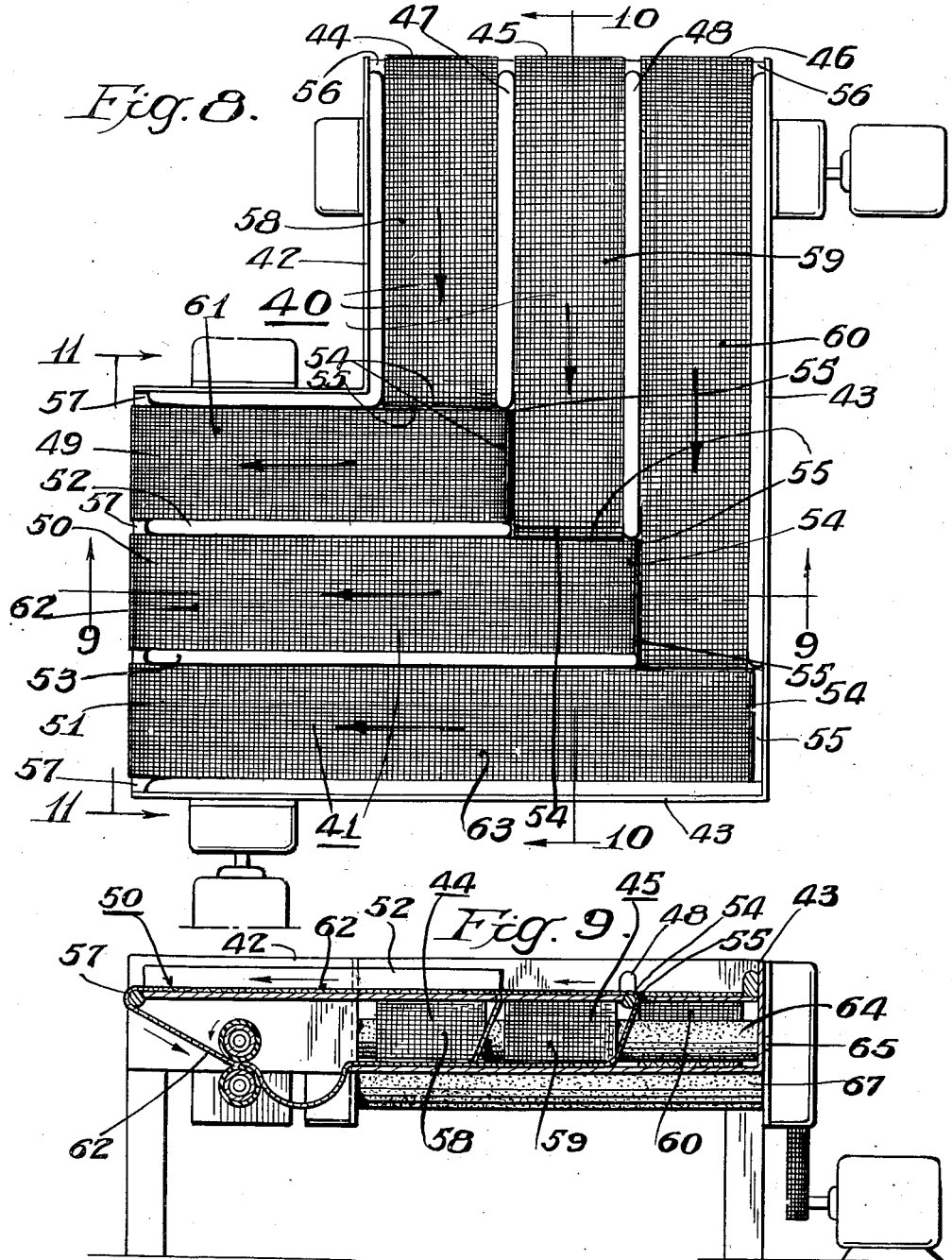

Dec. 31, 1946. F. STADELMAN 2,413,339
CONVEYER
Filed May 6, 1944 5 Sheets-Sheet 5
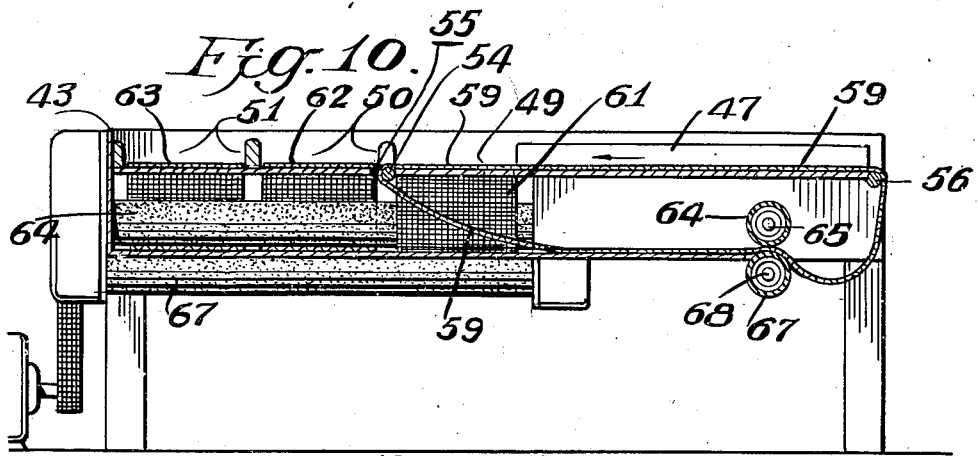
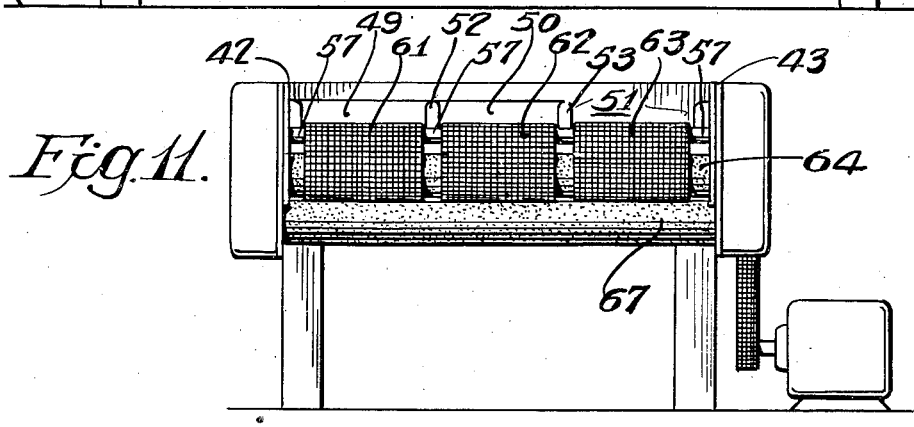
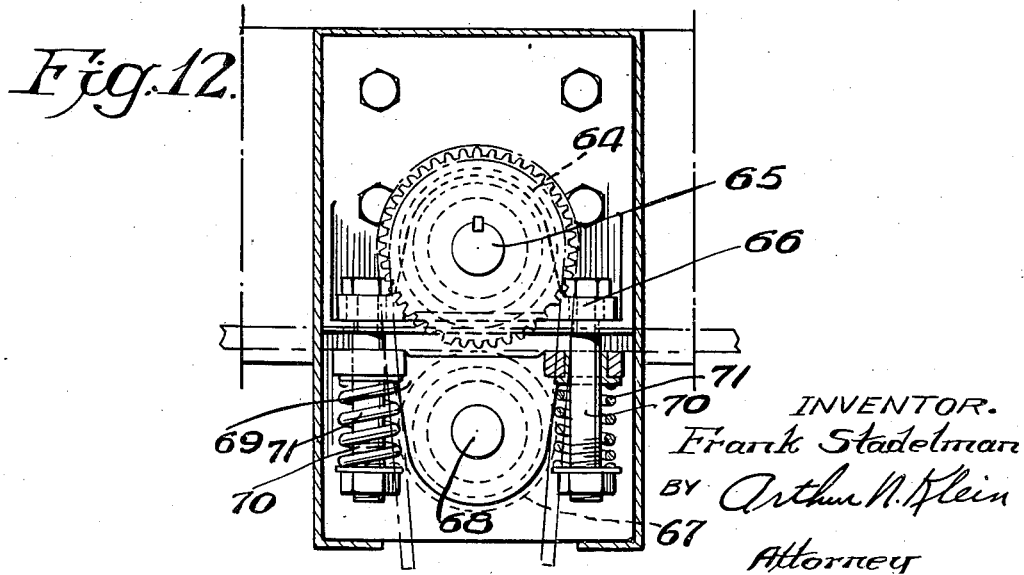
INVENTOR.
Frank Stadelman
BY Arthur N. Klein
Attorney Patented Dec. 31, 1946

2,413,339

UNITED STATES PATENT OFFICE 2,413,339

CONVEYER

Frank Stadelman, Cranford, N. J., assignor to Latendorf Conveying Corporation, Bayonne, N. J., a corporation of New Jersey Application May 6, 1944, Serial No. 534,455

9 Claims. (Cl. 198—182)

The present invention relates to conveying systems and it relates more particularly to conveyers of the endless belt type.

An object of the present invention is to provide a new and improved conveyer which is simple, inexpensive and efficient in construction and operation and which requires a minimum of parts. Another object of the present invention is to provide an endless-belt type conveyer which operates with minimum wear and power loss.

A further object of the present invention is to provide an endless-belt type conveyer which is equally well adapted for use on straight runs and around curves, as for example 180° curves.

Still another object of the present invention is to provide a conveyer in which the "endless-belt" element is provided with "slack" which permits it to follow a "bed" having curves or inclines therein.

Other objects and advantages of the present invention are apparent in the following detailed description, appended claims and accompanying drawings.

In the endless-belt type conveyer art, the problems of providing satisfactory conveyers for variously-inclined paths and particularly for curved paths have received considerable attention, but have never heretofore been adequately solved.

In conventional constructions heretofore, employed, extremely complicated mechanisms have been proposed to permit the conveyer element to go around curves as well as on straight runs. Such conventional constructions have been very expensive to produce, and have been subject to frequent failures of operation due to the complexity of the conveyer element and of the driving mechanism. As a result, most conventional constructions heretofore used, have employed separate conveyer elements for straight runs and for curves and have also employed separate conveyer elements for each differently-inclined portion of the path.

These conventional systems, have required different type conveyer elements for each curve of different radius of curvature and for a straight run, which further increased the cost of installation and maintenance.

I have found that the difficulties discussed above are due to the fact that the conveyer element of conventional construction has always been taut in operation with the result that the element is capable of following only a single predetermined path (either straight or fixed curvature). Furthermore, the tautness of conventional conveyer elements has resulted in excessive wear of the elements as well as of the supporting bed and driving mechanism due to friction.

According to the present invention, there is provided, for the first time, a conveyer element which operates with slack which permits the element to run "loose" under the pull of the driving means. In this way, friction and wear are reduced to a minimum and, by employing suitably flexible "belting," the conveyer element is enabled to move, not only along straight runs, but also along curves and differently-angled inclines.

In brief, the present invention contemplates the use of a flexible conveyer element or "belt" having a greater-than-normal length so that, when driven by suitable driving means at a point along its path, a "slack" zone or loop will result behind the driving means which permits the conveyer element to run "loose." The present invention contemplates, as a further feature, the use, with the foregoing mechanism, of a conveyer element made of transversely-extending metal links which are interconnected chain-wise to give "play" so that when the element, running "loose" as described above, is pulled along a curved path, the transversely-extending links arrange themselves generally radially of the curve to permit the conveyer element to assume a curved configuration.

For the purpose of illustrating the present invention, there are shown and described herein embodiments which are at present preferred since the same have been found in practice to give satisfactory and reliable results although it is to be understood that the various instrumentalities making up the present invention can be variously arranged and organized and that the present invention is not limited to the embodiments specifically disclosed.

Referring to the drawings in which like reference characters indicate like parts throughout:

Figure 1 represents a perspective view of one embodiment of the present invention.

Figure 2 represents a fragmentary cross-sectional view generally along the line 2—2 of Figure 1.

Figure 3 represents a cross-sectional view generally along the line 3—3 of Figure 1.

Figure 8 represents a plan view of another embodiment of the present invention adapted to effect a 90° change in the direction of conveyer travel.

Figure 9 represents a vertical cross-sectional view generally along the lines 9—9 of Figure 8.

Figure 10 represents a vertical cross-sectional view generally along the lines 10—10 of Figure 8.

Figure 11 represents an elevational view looking generally in the direction of the arrows 11—11 of Figure 8.

Figure 12 represents a view partly in section and partly in elevation showing the bearings of the drive rolls of the embodiment of Figure 8.

Figure 4:
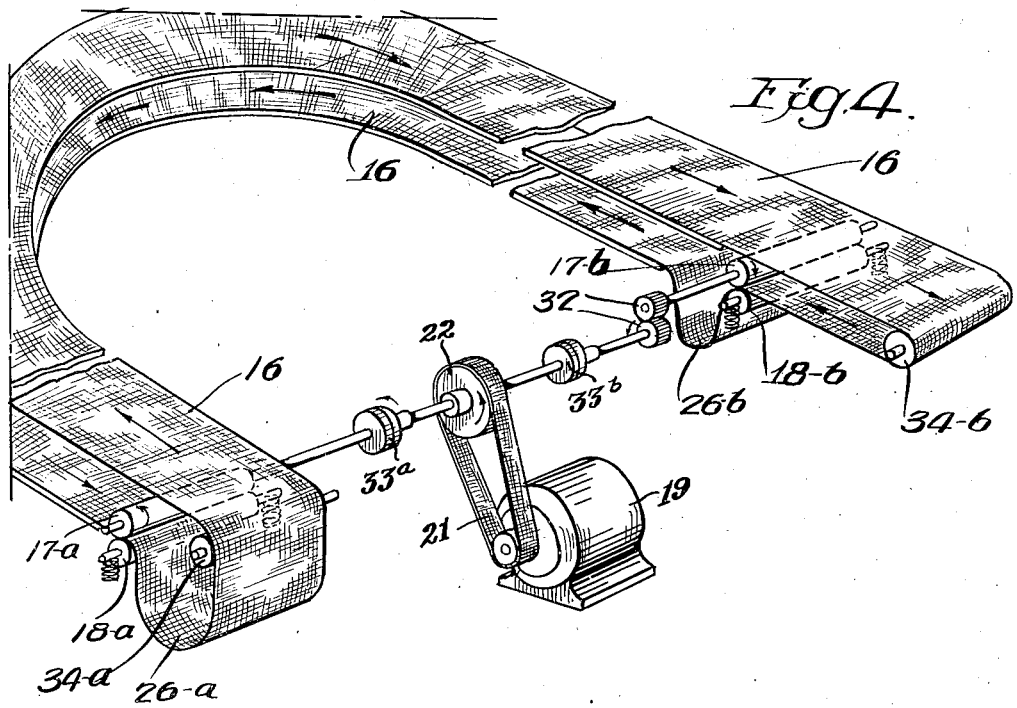
Figure 4 represents a schematic perspective view of a modified form of the present invention employing double drive means.

Referring now more particularly to the embodiment of Figures 1, 2 and 3, I may provide a conveyer frame, indicated generally by the reference character 10, provided with an upper working bed 11 and a lower return bed 12, as shown particularly in Figure 3.

The bed 11 has straight end portions 13 and 14 and an intermediate semi-circular portion 15; the return bed 12 being similar in shape.

Figure 6:
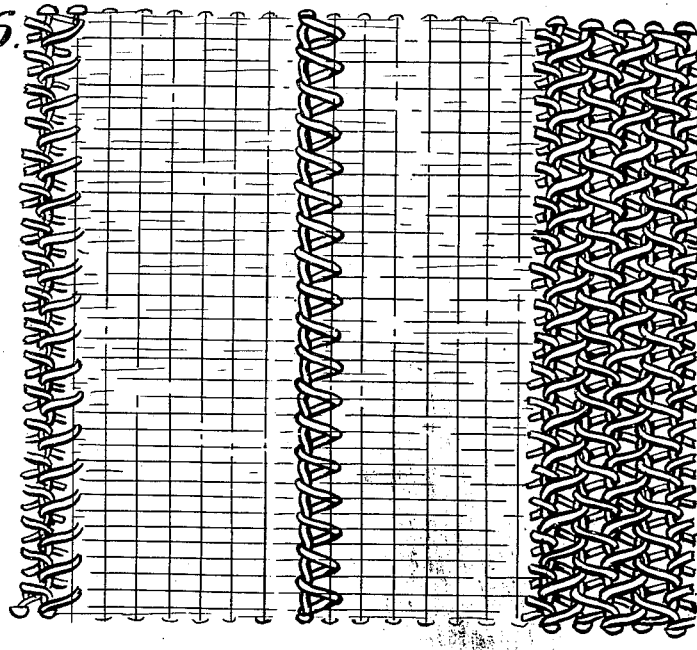
Figure 6 represents a fragmentary plan view, on an enlarged scale, of the conveyer belt of Figure 1, as it appears when the belt is moving along a straight run.
Figure 7:
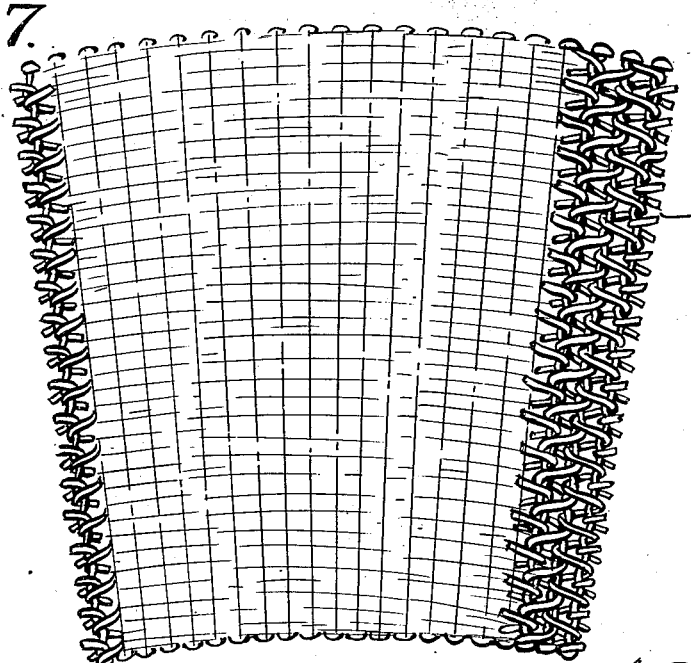
Figure 7 represents a view similar to that of Figure 6 but showing the belt as it appears when moving along a curve.

An endless flexible conveyer belt 16, the construction of which is shown particularly in Figures 6 and 7, is mounted upon the beds 11 and 12 as shown in Figure 1. The belt 16 is made up of relatively inflexible transversely-extending metal links which are woven interengagedly to permit longitudinal expansion and contraction of the belt.

As shown in Figure 2, the portion 13 of the upper working bed 11 extends somewhat beyond the end of the return bed 12, and driving means are provided thereunder for said belt 16. The driving means includes a pair of juxtaposed rubber-surfaced driving rolls 17 and 18. The upper roll 17 is a power roll, being driven by a motor 19, through a spur 20, a chain 21 and a sprocket-wheel 22; the sprocket-wheel 22 being keyed to the shaft 23 of the roll 17. Conventional speed reduction gearing (not shown) may be provided intermediate the motor 19 and the spur 20.

The lower roll 18 is an idler backing roll which is rotatably mounted on a shaft 24 by means of roller bearings 39. The shaft 24 is urged upwardly by coil springs 25 bearing against its ends. Thus, the roll 18 presses the intervening portion of the belt 16 up against the roll 17 and thereby provides a friction drive for said belt.

As can be seen particularly in Figures 1 and 2, the belt 16 is made somewhat oversize in length relative to the total length of the beds 11 and 12 so that a relatively slack loop 26 is formed therein in front of the driving rolls 17 and 18. That is, when the power roll 17 is rotating counterclockwise in Figure 2 and is pulling the belt 16 along its return run, the slack loop 26 is formed adjacent the outer end of the bed 11; the belt passing over the rounded edge 27 of the portion 13 of the bed 11 to enter its working run. If the roll 17 were made to rotate clockwise, by reversing the motor 19 or by shifting through conventional reversing gears (not shown), the belt 16 would be pulled in the opposite direction, i. e. over the rounded edge 27, and the slack loop 26 would be formed on the other side of the driving rolls (on the left in Figure 2).

The free end of the other straight portion 14 is provided with a rounded edge 28 (similar to the edge 27) over which the belt passes in going from the end of its working run to the beginning of its return run.

A retaining wall or shoulder 29 is provided along the inner edge of the beds 11 and 12. Retaining walls 30 and 31 may be provided along the outer edges of the portions 13 and 14.

It is apparent that, due to the slack loop 26, the belt 16 is pulled along the bed 11 on its working run, in relatively slack condition. This not only reduces friction and wear (as compared to conventional taut-belt constructions heretofore employed) but permits the belt readily to adapt itself to the semi-circular portion or curve 15 and to pass around said curve with a minimum of friction, resistance, slippage and power loss.

That is, with the belt running slack, the individual links thereof, which normally parallel each other as shown in Figure 6, are readily capable of rearranging themselves along radial lines (i. e. lines normal to the curve) so that the belt assumes the curved configuration shown in Figure 7 and conforms to the shape of the portion 15 of the bed 11.

Thus, it is possible according to the present invention, to provide a simple and inexpensive conveyer adapted equally well to go around curves and along straight runs. Except for the conveyer belt and the drive rolls, no moving parts whatever are involved. This makes the construction of the present invention immeasurably superior to comparable constructions heretofore employed, which required extremely complex and intricate mechanisms to attain a similar result much less effectively.

Furthermore, the present construction eliminates the necessity for the heavy "take-ups" required in conventional constructions employing a taut belt and a non-resilient drive pulley. The spring-pressed resilient-surfaced drive-rolls of the present invention grip the belt tightly so that it cannot slip. Thus, the belt is pulled positively along its working run even though it is relatively slack. As stated above, this results in much more efficient operation than is the case with conventional constructions wherein there is considerable power loss and wear due to the heavy "take-ups" which are needed to maintain the tautness necessary before the non-resilient drive pulley will drive the belt.

Moreover, in conventional taut-belt constructions, large-diameter rolls are required at the ends of the working run since, otherwise, excessive friction would result at the sharp bend-zones of the taut belt. In the present construction on the other hand, these rollers can be dispensed with and can be replaced with the small rounded edges over which the slack belt can move without appreciable friction or wear. These small rounded edges also permits the working run to be brought close to the juxtaposed end of a feeding or take-off conveyer whereas the conventional large-diameter edge-rollers heretofore used necessarily result in an undesirable gap between the ends of connecting conveyer belts.

In Figure 4, I have shown diagrammatically a modified form of the present invention which employs a double drive for the belt 16. That is, left and right hand pairs of rolls 17—a, 18—a and 17—b, 18—b, are driven by the motor 19, the drive belt 21 and the pulley 22; the direction of rotation of the roll 17—b being reversed by the geared spurs 32. Conventional clutches 33—a and 33—b are provided for the rolls 17—a and 17—b so that, should they get out of phase, the faster one can be momentarily disengaged from the sprocket wheel 22 to permit the slower one to catch up.

It can be seen that slack loops 26—a and 26—b are formed in front of the rolls 17—a and 17—b respectively.

In this embodiment, I may provide rolls 34—a and 34—b for the ends of the working run (in place of the rounded edges 27 and 28 of Figure 1).

In place of the construction shown in Figure 4, I may employ any conventional differential mechanism in driving the rolls 17—a and 17—b from the motor 19; as for example the differential mechanism employed with automobile driving wheels.

Figure 5:
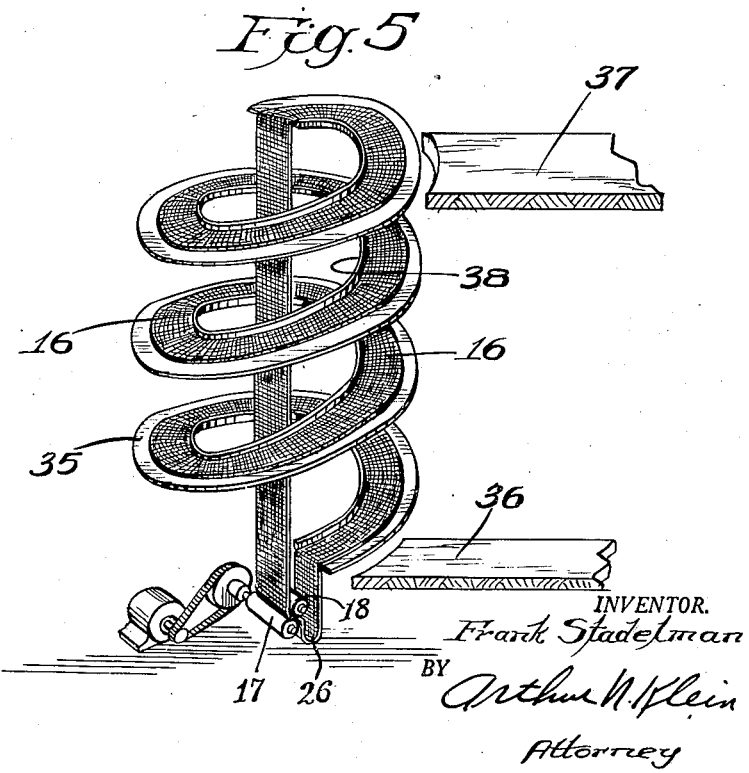
Figure 5 represents a schematic perspective view of another embodiment of the present invention adapted for conveying articles from one floor to the next.

In Figure 5, I have shown another embodiment of the present invention which is adapted for conveying articles from one floor to the next above. In this embodiment, a working bed 35, having an inner retaining wall or shoulder 38, is provided in the shape of a spiral over which the belt 16 runs vertically, generally axially of the spiral. The power roll 17 and the spring-pressed roll 18 grip the belt 16 at the bottom of its return run and pull it along; the slack loop 26 being formed in front of the rolls 17 and 18 as described hereinabove.

It is evident that this construction permits easy elevation of articles from the lower floor 36 to the upper floor 37 of Figure 5, a relatively "tight" spiral is possible with a highly desirable reduction in floor space required and with elimination of the complex, bulky and expensive mechanisms heretofore required for conveyers of this type.

Furthermore, it is not necessary for the belt, on its return run, to follow the necessarily tortuous path of the working run; it being possible for the return run to follow a straight path as described above. This results in lower initial cost, lower wear and lower power consumption.

In Figures 8 to 12, I have shown another embodiment of the present invention which is adapted to effect a 90° turn in a conveyer path. This embodiment includes an L-shaped bed having arms 40 and 41 which constitute the feed and take-off ends respectively thereof.

Retaining walls or shoulders 42 and 43 are provided along the inner and outer sides respectively of said bed.

The arm 40 is divided into three narrow beds 44, 45 and 46 by intermediate separating shoulders 47 and 48; the innermost bed 44 being shortest in length and the outermost bed 46 being longest as can be seen particularly in Figure 8.

The arm 41 is similarly divided into narrow beds 49, 50 and 51 by the intermediate separating shoulders 52 and 53. The inner ends of the beds 49, 50 and 51 extend to the outer edges of the beds 44, 45 and 46 respectively.

A rounded edge 54 and a slot 55 are provided at the inner end of each of the beds 44, 45, 46, 49, 50 and 51. Rounded edges 56 and 57 are provided at the outer ends of the arms 40 and 41 respectively.

Flexible endless conveyer belts 58, 59, 60, 61, 62 and 63 (similar to belt 16 but of appropriate length) are provided for the beds 44, 45, 46, 49, 50 and 51 respectively.

A rubber-surfaced power roll 64 is mounted underneath the arm 40; the shaft 65 of said roll 64 being journalled in end roller-bearings 66. A rubber-surfaced backing roll 67 is disposed beneath the roll 64. The shaft 68 of said backing roll 67 is mounted in end roller-bearings 69 which are slidably mounted on bolts 70 and are urged upwardly thereon by coil springs 71.

Similar rolls 64 and 67 are mounted underneath the arm 41.

The drive rolls under the arm 40 operatively engage the belts 58, 59 and 60 and pull the belts so that their upper working runs move inwardly along the beds 44, 45 and 46.

The drive rolls under the arm 41 grip the belts 61, 62 and 63 and pull said belts so that their upper working runs move outwardly along the beds 49, 50 and 51.

It is apparent that articles (as for example loaves of bread) which are brought to the outer end of the arm 40 (for example by a straight conveyer, not shown) will be picked up and carried inwardly by the belts 58, 59 and 60 until they are picked up by the perpendicularly moving belts 61, 62 and 63 which in turn carry them outward along the arm 41 to the outer end thereof from which they can be carried away by a straight conveyer (not shown).

As can be seen particularly in Figures 9, 10 and 11, the belts 58, 59, 60, 61, 62 and 63 are somewhat oversize in length so that slack loops are formed in front of the drive rolls and so that the belts are relatively slack on their working runs as described hereinabove. This permits the use of the small rounded edges in place of the rollers otherwise needed and allows the perpendicularly arranged belts to be brought in close proximity so that there is no undesirable gap therebetween. Moreover, the use of the spring-urged rubber-surfaced drive rolls and the slack belts eliminates the "take-ups otherwise needed for each individual belt.

I have found that (due to the elimination of the end rollers, "take-ups," etc.) the embodiment of Figure 8 can be manufactured for less than half the cost of a corresponding taut-belt unit heretofore employed.

It is obvious that, by mounting two units end-to-end, the embodiment of Figure 8 can be used to effect a 180° change in the direction of a conveyer path.

Other modifications of the prevent invention are possible and are contemplated.

Thus, in place of the rubber-surfaced drive rolls 17 and 18, other types of drives (such as for example, a single large diameter roll, or a sprocket wheel or belt) may be employed.

Other types of flexible belting may be employed in place of the purely illustrative belt 16.

It is possible to use any number of drive rolls or the like where it is desired to distribute the driving force more evenly.

Because of the slack condition of the belt, it will conform to a working bed having different angles of elevation, with which conventional taut belts cannot be used because of their tendency to be lifted upward and off the bed when the bed changes from lesser to greater inclination.

Thus in the embodiment of Figure 5, for example, the belt 16 conforms accurately to the spiral bed even though the lowermost and uppermost portions thereof have lesser inclination than the intermediate portions thereof.

Similarly, the slack belt of the present invention would conform accurately to a bed having a plurality of straight differently-inclined portions.

The present invention may be embodied in other forms and it is therefore desired that the present embodiments be considered in all respects as illustrative and not restrictive; reference

Having thus described my invention, what I claim as new and desire to secure by Letters Patent is:

1. In a conveyer, a flexible endless belt comprising a web of interconnected elements having freedom for transversely-differential lengthwise expansion and contraction arranged in a working run and a return run, a bed supporting the working run and including a laterally-curved portion, and driving means engaged with the return run only of the belt for pulling said return run, the web of said belt being longer than the combined lengths of the working and return runs whereby a slack zone is formed immediately in front of said driving means and whereby the working run is loosely disposed on said bed so that the interconnected elements are free to expand and contract around the laterally-curved portion of said bed.

2. In a conveyer, a flexible endless belt comprising a web of interconnected elements having freedom for transversely-differential lengthwise expansion and contraction arranged in a working run and a return run, a bed supporting the working run and including a straight portion and a laterally-curved portion, and driving means engaged with the return run only of the belt for pulling said return run, the web of said belt being longer than the combined lengths of the working and return runs whereby a slack zone is formed immediately in front of said driving means and whereby the working run is loosely disposed on said bed so that the inter-connected elements are free to expand and contract around the laterally-curved portion of said bed and are free to assume a straight-line configuration along the straight portion of the bed.

3. In a conveyer, a flexible endless belt comprising a web of interconnected elements having freedom for transversely-differential lengthwise expansion and contraction arranged in a working run and a return run, a bed supporting the working run and including a U-shaped laterally-curved portion, and driving means resiliently engaged with the return run only of the belt for pulling said return run, the web of said belt being longer than the combined lengths of the working and return runs whereby a slack zone is formed immediately in front of said driving means and whereby the working run is loosely disposed on said bed so that the interconnected elements are free to expand and contract around the laterally-curved portion of said bed.

4. In a conveyer, a flexible endless belt comprising a web of interconnected elements having freedom for transversely-differential lengthwise expansion and contraction arranged in a working run and a return run, a bed supporting the working run and including a laterally-curved portion, a second bed supporting the return run, and driving means engaged with the return run only of the belt for pulling said return run, the web of said belt being longer than the combined lengths of the working and return runs whereby a slack zone is formed immediately in front of said driving means and whereby the working run is loosely disposed on said bed so that the interconnected elements are free to expand and contract around the laterally-curved portion of said bed.

5. In a conveyer, a flexible longitudinally expansible and contractible endless belt having a working run and a return run, a stationary bed providing continuous and uninterrupted support for said working run, and driving means frictionally engaging said return run only, the length of said belt being greater than the combined lengths of the working and return runs whereby a slack zone is formed immediately in front of said driving means, said belt being devoid of take-up means.

6. In a conveyer, a flexible endless belt capable of longitudinal expansion and contraction and having a working run and a return run disposed below said working run, a bed supporting said working run, and a pair of juxtaposed driving rolls resiliently engaging said return run adjacent one end thereof, the length of said belt being greater than the combined lengths of the working and return runs whereby a slack zone is formed immediately in front of said driving rolls, said slack zone extending from said driving rolls to the front edge of said bed.

7. In a conveyer, a flexible endless belt capable of longitudinal expansion and contraction and having a working run and a return run disposed below said working run, a bed supporting said working run, a second bed supporting said return run, and a pair of juxtaposed driving rolls resiliently engaging said return run adjacent one end thereof, the length of said belt being greater than the combined lengths of the working and return runs whereby a slack zone is formed immediately in front of said driving rolls, said slack zone extending from said driving rolls to the edge of one of said beds.

8. In a conveyer, a flexible endless belt having a working run and a return run, a bed supporting said working run, driving means operatively engaging said return run adjacent both ends thereof, the length of said belt being greater than the combined lengths of the working and return runs whereby a slack zone is formed immediately in front of each of said driving means and whereby the working run is loosely disposed on said bed.

9. In a conveyer, a flexible endless belt having a working run and a return run, said belt comprising a web of interconnected elements having freedom for transversely-differential lengthwise expansion and contraction, a bed supporting said working run, said bed having a curve and a straight portion, driving means operatively engaging said return run adjacent both ends thereof, the length of said belt being greater than the combined lengths of the working and return runs whereby a slack zone is formed immediately in front of each of said driving means and whereby the working run is loosely disposed on said bed and is free to conform to the curve as well as the straight portion of said bed.

FRANK STADELMAN.